(No Model.)

J. OVERHALSER.
COMBINED CHURN AND BUTTER WORKER.

No. 494,222. Patented Mar. 28, 1893.

Witnesses:
J. B. McGirr.
H. D. Orr.

Inventor
Jeremiah Overhalser
By C. D. Campbell
Attorney

UNITED STATES PATENT OFFICE.

JEREMIAH OVERHALSER, OF BELLEFONTAINE, OHIO.

COMBINED CHURN AND BUTTER-WORKER.

SPECIFICATION forming part of Letters Patent No. 494,222, dated March 28, 1893.

Application filed June 20, 1892. Serial No. 437,373. (No model.)

*To all whom it may concern:*

Be it known that I, JEREMIAH OVERHALSER, a citizen of the United States, and a resident of Bellefontaine, in the county of Logan and State of Ohio, have invented a new and useful Butter-Worker and Churn, of which the following is a specification.

My invention relates to certain improvements in butter working machines and churns for working over butter in creameries, groceries or other places, or for churning.

Figure 1:
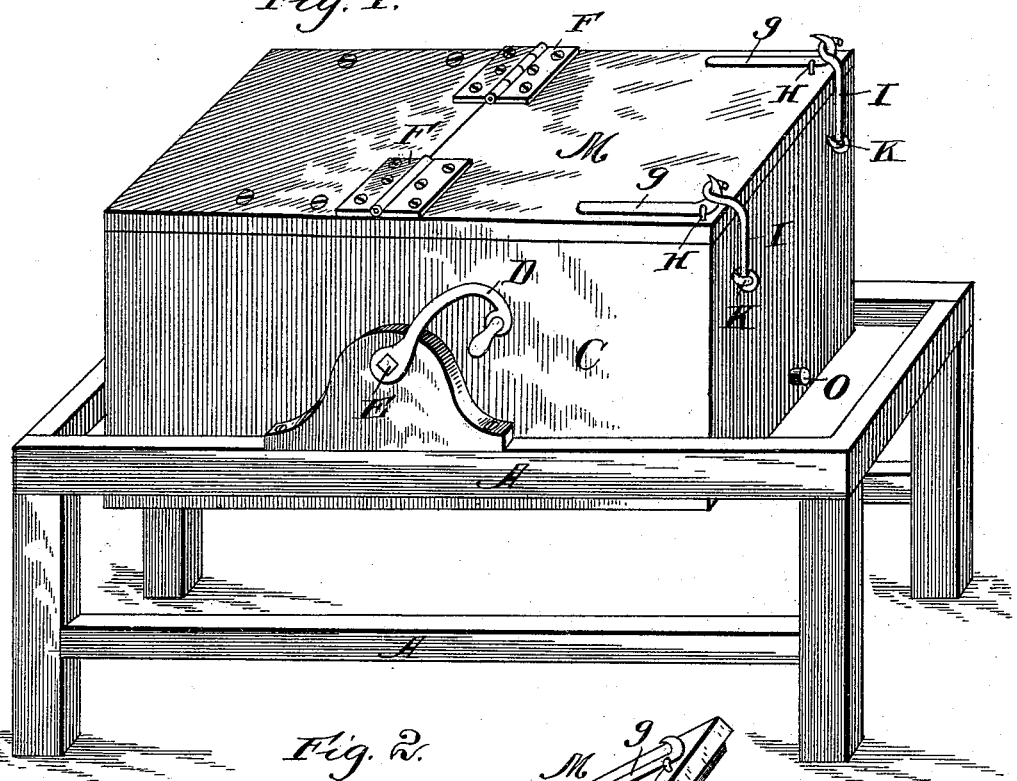
Figure 2:
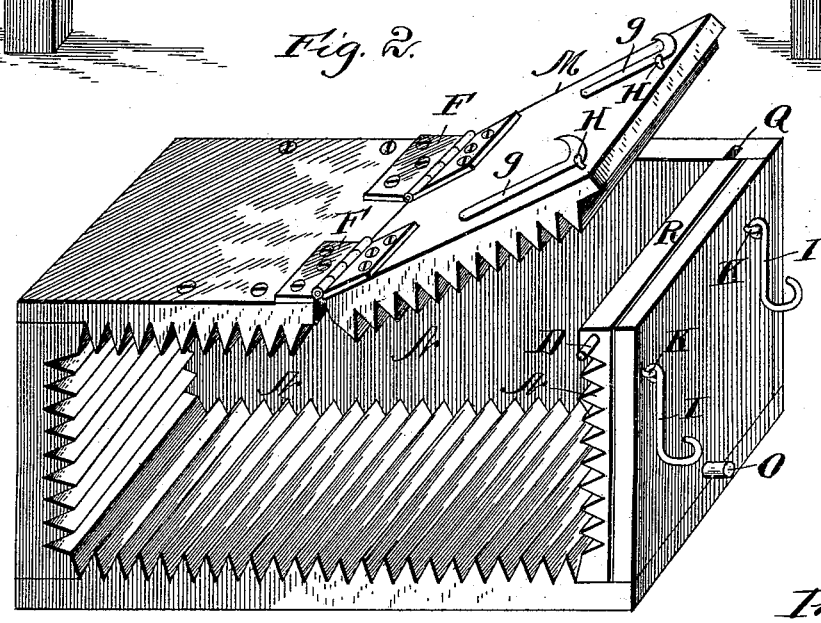

Figure 1 is a perspective view of my device; Fig. 2 a perspective view with the butter worker or box removed from the frame, and one side left off to show the interior.

My butter worker consists of a box C that can be made air or water tight, mounted on axle E in a frame A, and having crank D to revolve it with.

The interior of my box C has the bottom, top and ends formed with the sharp ridges or triangular projections N, on their faces, the inner faces of the sides being smooth, although the projections N may be on all the inside faces. The projections N may be of other form, but that shown is preferred. The top M is hinged in the middle by hinges F, and has the cam levers G near the end of the hinged part of the top, attached to the top by the staples H. Hinged to the end of the box are the bent hooks I, attached to the box by staples K.

In operation, in working over a lot of butter of different grades or colors, the butter is put in the box with as much fresh cream as desirable, the lid is shut down, the levers G, raised up, and the hooks I placed over them. The levers are then brought down flat on the top, locking the lid down so as to make it water tight. The box is then revolved by means of the crank, and the butter and cream thrown from one surface to another of the interior of the box, as the box revolves. The butter falling against the sharp projections N becomes thoroughly worked, and the cream churned and mixed with the butter. It will be seen that there is no grinding of the butter or mashing of the granules in working the butter in this manner, as there is where the working surface bears on the butter and slides along on it, and the cream does not fall from one surface to another in a solid body, but is projected in many different directions by the many surfaces of the projections N. After the butter is thoroughly worked, in the manner above described, the buttermilk is drawn off, at spout O, water is poured into the box, which is closed and revolved again to wash the butter. After the butter is washed sufficiently, the lid is raised again, the end piece R, having projections N on it, and which is made detachable, is removed from the box, the box revolved on its axle, and the butter allowed to drop in a pan, or on a table beneath. The end piece R is held in place by the pins P that fit in the slots Q in the sides of the box.

What I claim is—

1. In a butter worker or churn, the revolving box having the ridged inner faces, the removable fluted end piece, located in the end of the box beneath the opening lid as and for the purpose set forth.

2. In a butter worker or churn, the revolving box having the ridged inner faces, the removable fluted end piece, the pins P, and slots Q, as and for the purpose set forth.

JEREMIAH OVERHALSER.

Witnesses:
   J. S. LEEDOM,
   GEO. B. SNIFFIN.